United States Patent

Streifert

[11] 4,025,130
[45] May 24, 1977

[54] FLEXIBLE DAMPED BEARING ASSEMBLY

[75] Inventor: Keith L. Streifert, Duanesburg, N.Y.

[73] Assignee: Carrier Corporation, Syracuse, N.Y.

[22] Filed: Oct. 3, 1975

[21] Appl. No.: 619,323

[52] U.S. Cl. .................................... 308/9; 308/15
[51] Int. Cl.² ....................................... F16C 35/08
[58] Field of Search ................. 308/9, 36, 187, 15

[56] References Cited

UNITED STATES PATENTS 3,456,992   7/1969   Kulina .................................... 308/9
3,499,691   3/1970   Baier ..................................... 308/9

Primary Examiner—Joseph F. Peters, Jr.
Assistant Examiner—Richard A. Bertsch
Attorney, Agent, or Firm—J. Raymond Curtin

[57] ABSTRACT

A flexible damped bearing arrangement for rotatably mounting a shaft wherein the shaft bearing is supported within a movable member suspended from a stationary frame by means of a series of resilient springs adapted to permit the member to move radially in reference to the shaft. A squeeze film cavity, provided with high pressure fluid, is established between the movable member and the stationary frame to dampen the bearing's response to the shaft. Seals are provided outside the damping cavity and are arranged to act perpendicular to the direction of movement of the member whereby the interaction of the seals with the squeeze film damping is substantially minimized.

5 Claims, 1 Drawing Figure

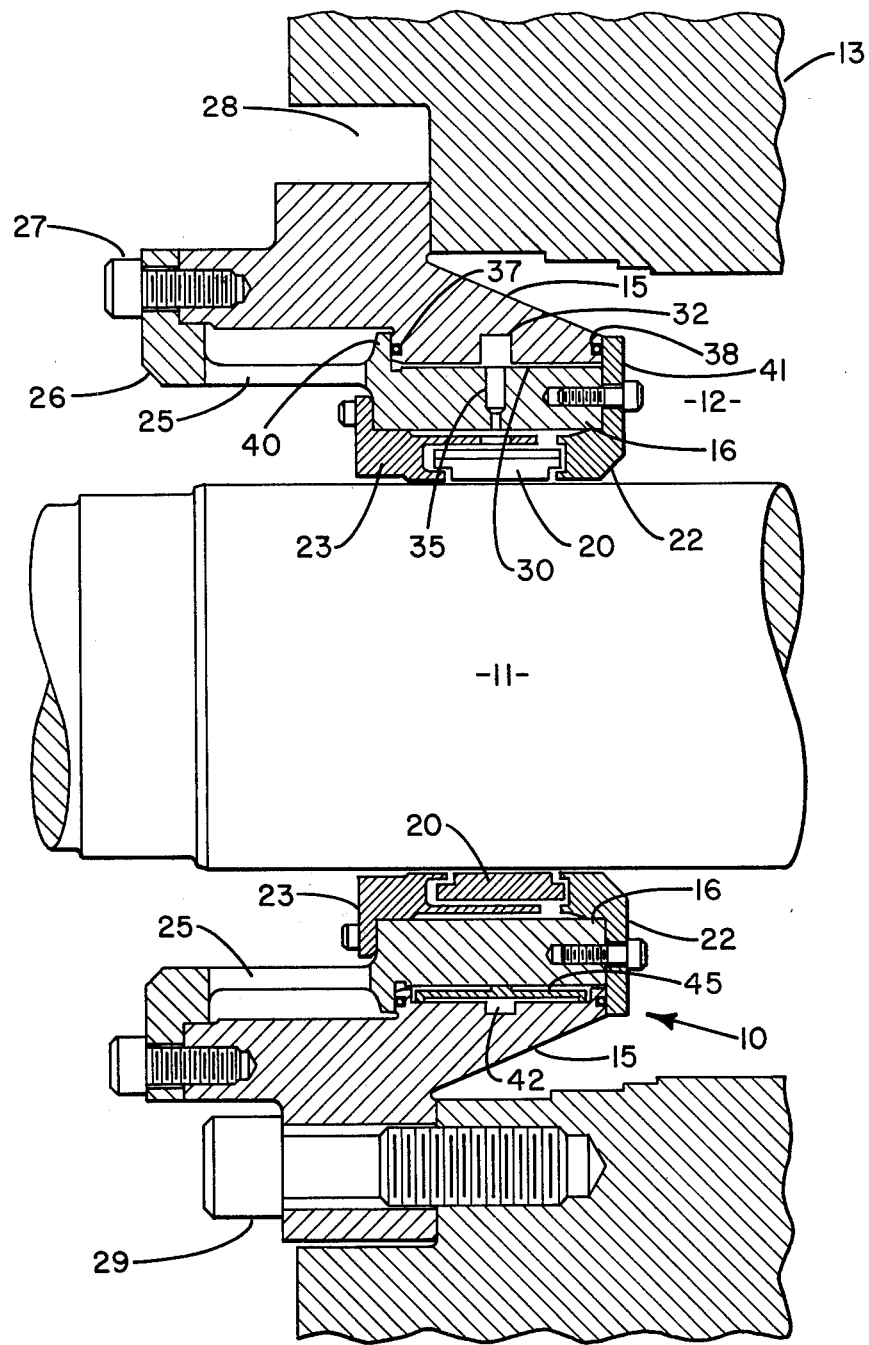

FLEXIBLE DAMPED BEARING ASSEMBLY

BACKGROUND OF THE INVENTION

This invention relates to a flexible damped bearing and, in particular, to a sealing arrangement for maintaining a high pressure squeeze film acting between a movable bearing support and a stationary component.

In U.S. Pat. No. 3,456,992, to Kulina, a flexible damped bearing is disclosed wherein the bearing is housed within a movable member and the member suspended from a stationary frame upon circumferentially spaced flexure springs. The springs are tuned to provide the bearing assembly with a predetermined mechanical stiffness capable of attenuating the harmful effects of shaft vibrations. To further enhance the bearing's response, a fluid squeeze film is formed about the movable member which acts against the stationary frame and thus serves to dampen the bearing's reaction to shaft induced vibrations. As disclosed by Kulina, seals are maintained within the damping cavity to contain the high pressure damping fluid therein. The seals are adapted to ride against the side walls of the cavity and thus add friction or coulomb damping to the system. Because two separate and distinct damping mechanisms are involved, the design of the damping system, particularly where the bearing must react in a prescribed manner over a wide range of frequencies, becomes relatively complex. Furthermore, when this type of mechanical or friction damping is present, the seals become worn with usage thus producing an unwanted change in the damping characteristics of the system.

SUMMARY OF THE INVENTION

It is therefore an object of the present invention to improve flexible damped bearings.

It is a further object of the present invention to eliminate unwanted friction forces acting upon a squeeze film damping system.

A further object of the present invention is to provide a sealing arrangement for use in a flexible damped bearing which will not interact with the damping of the fluid damping film.

These and other objects of the present invention are attained by means of a bearing assembly having a movable member for supporting a shaft bearing, resilient springs for suspending the movable member from a stationary frame, a film cavity containing high pressure fluids being adapted to act between the movable member and the stationary frame, and seals for preventing the high pressure fluid from escaping from the cavity, the seals being positioned outside of the cavity and disposed in sealing relationship with the movable member within a region wherein the seals do not interact with the damping provided by the high pressure fluid.

BRIEF DESCRIPTION OF THE DRAWING

For a better understanding of the present invention, as well as other objects and further features thereof, reference is had to the following detailed description of the invention to be read in connection with the accompanying drawing which is a side view in section illustrating a flexible damped bearing assembly encompassing the teachings of the present invention.

DESCRIPTION OF THE PREFERRED EMBODIMENT

Referring now to FIG. 1, there is illustrated a flexible damped bearing assembly 10, embodying the teachings of the present invention, which is arranged to support a shaft 11 of a rotary machine within an opening 12 formed in the end wall 13 thereof. It should be understood that the rotary machine can take any form, such as a turbine or a compressor, having its rotary components mounted upon a generally horizontally extended shaft or any other arrangement where the rotor is capable of exerting a relatively high static load upon the bearing. The bearing assembly includes an outer stationary housing 15 having an annular opening centrally located therein in which is carried a cylindrical movable member 16. A series of tilt shoe bearings 20 are movably mounted upon rocker pads (not shown) within the movable member and the shaft journaled for rotation within the tilt shoes. Although a tilt shoe bearing is employed in the preferred embodiment of the present invention, it should be understood that any suitable bearing can be similarly employed herein without departing from the teachings of the present invention. A pair of end covers 22, 23 are affixed to the movable member, the inner surfaces of which are arranged to enclose the tilt shoe and rocker pads in assembly.

The movable member 16 is resiliently supported within the bearing housing upon a series of axially extended flexure springs 25 equally spaced about the body of the member. The springs 25 terminate in a bolting ring 26 that is secured to the left-hand end face of the housing, as seen in FIG. 1, by means of bolts 27, or the like. The housing, in turn, is carried within an annular opening 28 formed in the end wall and rigidly held in place via bolts 29.

In assembly, a uniform annular squeeze film cavity 30 is established between the outer periphery of the moving member 16 and the interior wall of the opening contained within the housing 15. Fluid, under a pressure which is high enough to prevent rupturing of the squeeze film due to the velocity-dependent dynamic forces produced during machine operations, is delivered into the cavity via an annular chamber 32 formed within the stationary housing. In operation, the high pressure fluid is bled from the cavity by metering ports 35 and passed into the tilt shoe region where it is further utilized to create a hydrodynamic wedge between the shoes and the shaft.

To seal the squeeze film cavity against unwanted leakage, a pair of O-rings 37, 38 are provided which are located outside of the squeeze film cavity. The seals are arranged to be carried within annular grooves machined or otherwise formed in two opposed radially extended side walls of the bearing housing. A pair of radially extended flanges 41, 40, carried upon the movable member 16, overlie the side walls of the bearing housing and act against the O-rings to establish a fluid-tight seal therebetween. The compressive sealing force of each seal is exerted generally perpendicular to the direction of movement of member 16 and thus has little effect upon the horizontal damping forces involved. By the same token, locating the seals outside of the cavity prevents the seals from being further compressed by the movable member as it moves radially in compliance with the shaft as the shaft deflects under vibration induced loads. As a result, the seals do not interact with the damping provided by the fluid film thus permitting the damping film to respond in a predetermined manner over a wide range of operating frequencies. Furthermore, the seals may be constructed of a material having a relatively low surface tension, such as Teflon, thus minimizing the amount of friction development between the seal and the radially extended flanges.

At least one helper spring 45 is provided within the bearing assembly that is arranged to support the static or dead weight of the rotor. As illustrated, the spring is carried in an axially elongated groove 42 formed in the inner wall of the bearing housing opening. The spring is preloaded in assembly to deliver a biasing force, acting between the stationary housing and the movable member, which supports the static weight of the rotor acting upon the bearing. By so supporting the rotor, the flexure springs 25 are prevented from being preloaded or initially deformed in assembly. As a result, the uniform integrity of the squeeze film cavity is preserved, allowing the bearing to react in a predictable manner.

While this invention has been described with reference to the structure herein disclosed, it is not confined to the details as set forth, and this application is intended to cover any modifications or changes as may come within the scope of the following claims.

What is claimed is:

1. In a flexible damped bearing, for rotatably supporting a shaft, of the type wherein the bearing is mounted within a movable member that is suspended from a stationary frame upon a series of flexure springs and having a cavity containing a fluid film located between the movable member and the stationary frame for damping the bearing reaction, the improvement comprising seals for maintaining the fluid film within the cavity, said seals being located outside of the damping cavity and being positioned in respect to the movable member to prevent the seals from being compressed by the movable member as said member moves in compliance with the shaft whereby the seals are precluded from interacting with the fluid film to contribute unwanted damping to the system.

2. The flexible damped bearing of claim 1 wherein the seals are positioned between adjacent radially extended side walls carried by the movable member and the stationary frame to form a fluid-tight seal therebetween.

3. The flexible damped bearing of claim 1 wherein the seals are compressed against radially extended flanges carried upon the movable member whereby the force of compression is substantially perpendicular to the direction of movement of the member.

4. The flexible damped bearing of claim 3 wherein the seals are annular rings formed of a material having a low surface tension whereby the friction generated between the seal and the movable member is minimized.

5. The flexible damped bearing of claim 4 wherein the seal is capable of maintaining oil within the cavity at pressures sufficiently high enough to prevent the damping film from rupturing under dynamic forces produced under operating conditions.

* * * * *